United States Patent
Lee

(10) Patent No.: US 9,172,492 B2
(45) Date of Patent: Oct. 27, 2015

(54) TIME/WAVELENGTH-DIVISION MULTIPLEXED PASSIVE OPTICAL NETWORK (TWPON)

(71) Applicant: National Taiwan University of Science and Technology, Taipei (TW)

(72) Inventor: San-Liang Lee, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 0 days.

(21) Appl. No.: 14/598,079

(22) Filed: Jan. 15, 2015

(65) Prior Publication Data

US 2015/0163011 A1    Jun. 11, 2015

Related U.S. Application Data

(62) Division of application No. 13/527,573, filed on Jun. 19, 2012.

(30) Foreign Application Priority Data

Feb. 29, 2012   (TW) .............................. 101106524 A

(51) Int. Cl.
  *H04J 4/00*      (2006.01)
  *H04B 10/20*     (2006.01)
  *H04J 14/00*     (2006.01)
  *H04J 14/08*     (2006.01)
  *H04J 14/02*     (2006.01)

(52) U.S. Cl.
  CPC *H04J 14/08* (2013.01); *H04J 14/02* (2013.01)

(58) Field of Classification Search
  CPC .............. H04J 14/0232; H04J 14/0246; H04J 14/0282; H04J 14/0235; H04J 14/0265; H04J 14/0247; H04J 14/025; H04J 14/0252; H04J 14/0227; H04J 14/08; H04J 14/02
  USPC ....................................... 398/58–75
  See application file for complete search history.

(56) References Cited

U.S. PATENT DOCUMENTS

| | | | | |
|---|---|---|---|---|
| 4,486,890 A | * | 12/1984 | Hammes | 377/24.1 |
| 5,440,416 A | * | 8/1995 | Cohen et al. | 398/82 |
| 5,742,414 A | * | 4/1998 | Frigo et al. | 398/66 |
| 5,808,764 A | * | 9/1998 | Frigo et al. | 398/72 |

(Continued)

OTHER PUBLICATIONS

Son et al, Bidirectional WDM Passive Optical Network for Simultaneous Transmission of Data and Digital Broadcast Video Service, 2003, IEEE, vol. 21 Issue 8, pp. 1723-1727.*

(Continued)

*Primary Examiner* — Ken Vanderpuye
*Assistant Examiner* — Dibson Sanchez

(57) ABSTRACT

The present invention discloses a time/wavelength-division multiplexed passive optical network (TWPON), which has an optical splitter (21) and a waveguide grating router (WGR) (22) disposed at a remote node (RN) (20). The optical splitter (21) and the WGR (22) can be connected in a cascade or in a parallel such that the present invention can use less number of wavelengths to increase transmission capacity or increase the number of users. A channel fault monitoring (CFM) module provided at an optical line terminal (OLT) is utilized to locate fiber breaks among distribution fibers. The TWPON of the present invention can provide TDM-PON, WDM-PON, and Hybrid PON co-existing platform with less wavelengths channel fault monitoring mechanism.

4 Claims, 6 Drawing Sheets

(56) References Cited

U.S. PATENT DOCUMENTS

| | | | |
|---|---|---|---|
| 5,926,298 A * | 7/1999 | Li | 385/24 |
| 6,118,565 A * | 9/2000 | Frigo | 398/68 |
| 6,381,047 B1 * | 4/2002 | Frigo et al. | 398/79 |
| 6,697,574 B2 * | 2/2004 | Frigo et al. | 398/71 |
| 7,283,748 B2 * | 10/2007 | Jung et al. | 398/72 |
| 7,286,761 B2 * | 10/2007 | Birk et al. | 398/66 |
| 7,603,036 B2 * | 10/2009 | Palacharla et al. | 398/72 |
| 7,639,908 B2 * | 12/2009 | Das et al. | 385/24 |
| 7,773,838 B2 | 8/2010 | Lee et al. | |
| 7,912,372 B2 * | 3/2011 | Lee et al. | 398/72 |
| 8,086,102 B2 * | 12/2011 | Kim et al. | 398/67 |
| 8,238,751 B1 * | 8/2012 | Iannone et al. | 398/82 |
| 8,285,143 B2 * | 10/2012 | Kim et al. | 398/69 |
| 8,364,041 B2 * | 1/2013 | Urban | 398/139 |
| 8,682,164 B2 * | 3/2014 | Tien et al. | 398/72 |
| 8,861,963 B2 * | 10/2014 | Lee et al. | 398/68 |
| 2002/0145775 A1 * | 10/2002 | Effenberger et al. | 359/123 |
| 2002/0145780 A1 * | 10/2002 | Frigo et al. | 359/125 |
| 2002/0171888 A1 * | 11/2002 | Melaragni | 359/123 |
| 2002/0196491 A1 * | 12/2002 | Deng et al. | 359/124 |
| 2005/0152696 A1 * | 7/2005 | Shin et al. | 398/71 |
| 2006/0002706 A1 * | 1/2006 | Lee et al. | 398/71 |
| 2006/0067692 A1 * | 3/2006 | Park et al. | 398/75 |
| 2006/0153565 A1 * | 7/2006 | Park et al. | 398/71 |
| 2006/0239682 A1 * | 10/2006 | Park et al. | 398/71 |
| 2007/0147837 A1 * | 6/2007 | Yoo et al. | 398/72 |
| 2007/0154217 A1 * | 7/2007 | Kim et al. | 398/72 |
| 2007/0177873 A1 * | 8/2007 | Hyun et al. | 398/72 |
| 2010/0215361 A1 * | 8/2010 | Ansari et al. | 398/25 |
| 2010/0239247 A1 * | 9/2010 | Kani et al. | 398/41 |
| 2011/0026923 A1 * | 2/2011 | Kim et al. | 398/79 |
| 2011/0135306 A1 * | 6/2011 | Kim et al. | 398/68 |
| 2011/0158650 A1 * | 6/2011 | Cavaliere et al. | 398/79 |
| 2012/0251108 A1 * | 10/2012 | Chen et al. | 398/49 |
| 2013/0039656 A1 * | 2/2013 | Lam et al. | 398/47 |
| 2013/0129355 A1 * | 5/2013 | Tien et al. | 398/72 |
| 2013/0142512 A1 * | 6/2013 | Cheng | 398/66 |

OTHER PUBLICATIONS

Shu-Chuan Lin, Ye-Li Shiu and San-Liang Lee, "Simultaneous bidirectional wire-line and wireless signal transmission based on a cross-remodulation WDM-PON", 36th European Conference and Exhibition on Optical Communication, Sep. 19-23, 2010, Torino, Italy.

Carlos Bock, Josep Prat and Stuart D. Walker, "Hybrid WDM/TDM PON using the AWG FSR and featuring centralized light generation and dynamic bandwidth allocation", Journal of Lightwave Technology, Dec. 2005, pp. 3981-3988, vol. 23, Issue 12.

Calabretta, N., Presi, M., Proietti, R., Contestabile, G. and Ciaramella, E., "A bidirectional WDM/TDM-PON using DPSK downstream signals and a narrowband AWG", Photonics Technology Letters, Aug. 15, 2007, pp. 1227-1229, IEEE (vol. 19, Issue 16).

* cited by examiner

FIG. 2

TIME/WAVELENGTH-DIVISION MULTIPLEXED PASSIVE OPTICAL NETWORK (TWPON)

CROSS REFERENCE TO RELATED APPLICATION

This is a division of a U.S. patent application Ser. No. 13/527,573, filed on Jun. 19, 2012.

TECHNICAL FIELD OF THE INVENTION

The present invention relates to a passive optical network (PON), and more particularly, to a passive optical network capable of giving much flexibility to increase transmission capacity and the number of users.

BACKGROUND OF THE INVENTION

Generally, a passive optical network comprises an optical line terminal (OLT), a remote node (RN), and a plurality of optical network units (ONUs). A terminal such as a personal computer (PC) is connected to the ONU and the ONU will transform a signal transmitted from the terminal into an optical signal. The optical signal is split by an optical splitter at the RN and then transmitted to a central office (CO) of a service provider, i.e., the aforesaid OLT, through an optical fiber. After the OLT performs various types of signal processing, communication between one ONU and another ONU or communication between the ONU and another terminal on network can be carried out.

Currently, an optical access network can be classified into a time-division multiplexed passive optical network (TDM-PON), a wavelength-division multiplexed passive optical network (WDM-PON), and a hybrid passive optical network (Hybrid PON).

For TDM-PON, 10G-PON was accomplished and standardized in 2010 and next generation will be 40G-PON or 100G-PON. For 10G-PON, each concurrent user can have 10/N Gb/s bandwidth in average, where N is the number of ONUs. In another aspect, the WDM-PON is not standardized yet. Current technology can offer each user with 1.25 to 10 Gb/s bandwidth. The WDM-PON is a virtual point-to-point topology, which needs a pair of transceivers at the OLT for each ONU.

The TDM-PON structure may not serve the needs when the demand for larger bandwidth is increased. This is because it might be more difficult in system design and costly to use higher speed transceivers that are required in 40G-PON or 100G-PON. Especially, it might require burst mode transceivers for higher data rate. Also, power budget might be a problem. It may need avalanche photo-diode (APD) receivers, forward error correction (FEC) encoders, or optical amplifiers at the OLT or even at the ONUs. Further, it may eventually need to use cooled laser sources to avoid signal fluctuation caused by temperature variation.

The advantages of the WDM-PON structure is that it has larger bandwidth and gives much flexibility for different types of services and different bandwidths, and at the same time has better security. However, the WDM-PON structure is costly. If services are provided to N users, N dense wavelength-division multiplexing (DWDM) transceivers and N colorless ONU light sources are needed at the OLT. However, the DWDM transceivers and colorless light sources are still quite expensive. In addition, different wavelength bands may be needed for upstream and downstream transmission. For example, assuming that the channel spacing is 0.8 nm and the structure is designed to provide for 32 users, the total optical bandwidth in use is required to be 51.2 nm, and this occupies a quite large optical bandwidth.

Further, for the channel fault monitoring (CFM) issues for TDM-PON, special high-sensitivity OTDR (optical time-domain reflectometer) such as a photon-counting OTDR needs to be used for the monitoring due to large splitting loss of the optical splitter at the RN. Meanwhile, it is also proposed to add optical filters or wavelength-selective reflectors (e.g., fiber Bragg gratings, FBG) to the distribution fibers and use tunable OTDR (T-OTDR) to locate fiber breaks among the distribution fibers. The tunable OTDR is relatively high in cost and the use of the tunable OTDR requires a larger optical bandwidth for the channel monitoring.

For the channel fault monitoring issues for WDM-PON, a large optical bandwidth for the channel fault monitoring is needed because it requires an OTDR with a tunable light source or a broadband light source to reach each distribution fiber due to the wavelength selective characteristic of the WGR at the RN. For example, assuming that the channel spacing is 0.8 nm and the WDM-PON structure is designed to provide for 32 ONUs, the required optical bandwidth for the channel fault monitoring is 25.6 nm besides the possible 51.2 nm bandwidth for the upstream and downstream transmission. Optical bandwidth might be very tight if more service channels (e.g., video, audio, or radio over fiber (RoF)) are going to be added to the WDM-PON structure.

In addition, Hybrid PON generally has following two types: (1) cascading WDM-PON with a TDM-PON for extended services to more users and/or longer distance with an extended box; (2) connecting WDM-PON and TDM-PON in parallel to provide both point-to-point (i.e., WDM) and broadcasting (i.e., TDM) services.

SUMMARY OF THE INVENTION

An objective of the present invention is to provide a time/wavelength-division multiplexed passive optical network (TWPON) for giving much flexibility to increase transmission capacity and the number of users.

To achieve the above objective, the present invention is to provide a time/wavelength-division multiplexed passive optical network (TWPON), which is divided into an optical line terminal, a remote node, and a plurality of optical network units in structure, characterized in that the TWPON comprises: an optical splitter for splitting a mixed optical signal, comprising a set of wavelengths that are different from each other, received from the optical line terminal, to form multi-way mixed optical signals; and a multiple-input and multiple-output waveguide grating router coupled to the optical splitter, having a plurality of input ports and a plurality of output ports, wherein the input ports respectively receive the multi-way mixed optical signals, and the output ports respectively output wavelength components of each mixed optical signal of the multi-way mixed optical signals to the optical network units, wherein at least two optical network units receive optical signals, which are coded and transmitted with a time-division manner, having the same wavelength component.

In another aspect, the present invention provides a time/wavelength-division multiplexed passive optical network (TWPON), which is divided into an optical line terminal, a remote node, and a plurality of optical network units in structure, characterized in that the TWPON comprises: a first-stage optical splitter for splitting a received time-division optical signal to form multi-way time-division optical signals; a multiple-input and multiple-output waveguide grating router, coupled to outputs of the optical splitter, having a plurality of input ports and a plurality of output ports, wherein the input ports respectively receives the multi-way time-division optical signals, the output ports respectively outputs the multi-way time-division optical signals, and each output port outputs a single time-division optical signal; a plurality of second-stage optical splitters respectively coupled to the output ports of the multiple-input and multiple-output waveguide grating router, wherein each second-stage optical splitter is utilized to split the single time-division optical signal outputted from each output port of the multiple-input and multiple-output waveguide grating router again, and the time-division optical signals split and obtained from the second-stage optical splitters are respectively transmitted to the optical network units; and a wavelength band filter disposed at a front end of the first-stage optical splitter, wherein the wavelength band filter is utilized to select a mixed optical signal, which comprises a set of wavelengths that are different from each other, from the optical line terminal, and make the mixed optical signal entering one of the input ports of the multiple-input and multiple-output waveguide grating router, the output ports of the multiple-input and multiple-output waveguide grating router respectively output wavelength components of the mixed optical signal to the respective second-stage optical splitters, and each second-stage optical splitter splits the received wavelength component again, wherein at least two optical signals having the same wavelength component received by optical network units, are coded and transmitted with a time-division manner.

In yet another aspect, the present invention provides a time/wavelength-division multiplexed passive optical network (TWPON), which is divided into an optical line terminal, a remote node, and a plurality of optical network units in structure, characterized in that the TWPON comprises: an optical splitter for splitting a time-division optical signal received to form multi-way time-division optical signals; a waveguide grating router, arranged in parallel with the optical splitter, receives a mixed optical signal, which comprises a set of wavelengths that are different from each other, from the optical line terminal, and outputs wavelength components of the mixed optical signal; and a plurality of wavelength band filters respectively disposed between corresponding output ports of the optical splitter and the waveguide grating router, each wavelength band filter is connected to one optical network unit for selecting the time-division optical signal to be transmitted with a time-division manner or selecting one of the wavelength components of the mixed optical signal to be transmitted with a wavelength-division manner.

In still yet another aspect, the present invention provides a time/wavelength-division multiplexed passive optical network (TWPON), which is divided into an optical line terminal, a remote node, and a plurality of optical network units in structure, characterized in that the TWPON comprises: a first-stage optical splitter for splitting a time-division optical signal received to form multi-way time-division optical signals; a waveguide grating router, arranged in parallel with the first-stage optical splitter, receives a mixed optical signal, which comprises a set of wavelengths that are different from each other, from the optical line terminal, and respectively outputs wavelength components of the mixed optical signal; and a plurality of wavelength band filters respectively disposed between corresponding output ports of the first-stage optical splitter and the waveguide grating router; and a plurality of second-stage optical splitters, connected to the wavelength band filters in a one-to-one relationship, utilized for splitting the time-division optical signals or the wavelength components of the mixed optical signal from the respective wavelength band filters again and then transmitting them to the respective optical network units.

Compared to a traditional time-division multiplexed passive optical network (TDM-PON), the TWPON implemented according to the present invention can carry out high-capacity transmission at relatively low cost, and does not have a problem of unable to increase transmission capacity in the traditional TDM-PON, caused by the limitation of high-speed transceivers themselves. Compared to a traditional WDM-PON, the TWPON implemented according to the present invention can use less numbers of wavelengths to carry out the same transmission capacity, and meanwhile occupied optical wavelength bands are relatively small and the cost of used light sources is relatively low as well. The TWPON of the present invention can efficiently integrate and access to the network as desired, is able to provide different services in response to different demands for transmission bandwidth, and also can increase transmission capacity at relatively low cost in response to the increasing of users.

BRIEF DESCRIPTION OF THE DRAWINGS

FIG. 2 is a schematic diagram showing input and output of a waveguide grating router.

DETAILED DESCRIPTION OF THE INVENTION

Figure 1:
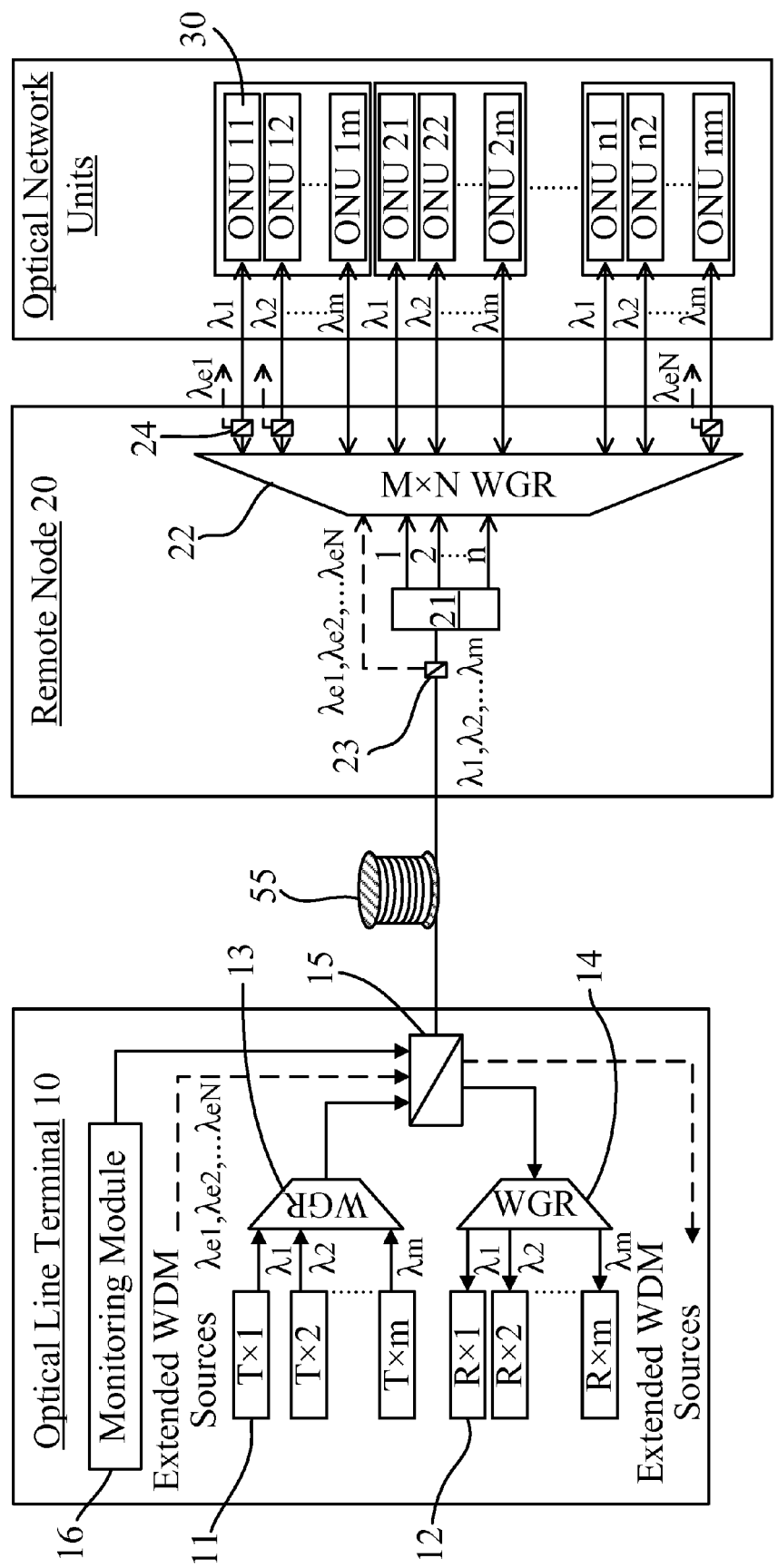
FIG. 1 is a schematic structural diagram showing a time/wavelength-division multiplexed passive optical network (TWPON) according to a first embodiment of the present invention.

FIG. 1 is a schematic structural diagram showing a time/wavelength-division multiplexed passive optical network (TWPON) according to a first embodiment of the present invention. The TWPON according to the first embodiment of the present invention is a wavelength-division multiplexed passive optical network (WDM-PON) based on a time-division manner, or called a WDM-PON like architecture. As shown in FIG. 1, The TWPON of the first embodiment is divided into an optical line terminal (OLT) 10 (for example, located at a central office (CO) of a service provider), a remote node (RN) 20, and a plurality of optical network units (ONUs) 30 in structure. Optical fibers 55 are distributed therebetween for transmitting optical signals.

As shown in FIG. 1, a 1×n optical splitter 21 and a M×N multiple-input and multiple-output waveguide grating router (WGR) 22 are arranged at the RN 20. The optical splitter 21 receives a mixed optical signal $\{\lambda1, \lambda2, \ldots \lambda m\}$ from the OLT 10. The mixed optical signal $\{\lambda1, \lambda2, \ldots \lambda m\}$ comprises a set of wavelengths (e.g., m wavelengths) that are different from each other. The optical splitter 21 will split or shunt the mixed optical signal $\{\lambda1, \lambda2, \ldots \lambda m\}$ to form multi-way (e.g., n ways) mixed optical signals $\{\lambda1, \lambda2, \ldots \lambda m\}$, wherein each way or each channel is constituted of wavelengths $\lambda1$, λ2, . . . λm. The WGR 22 is coupled to the optical splitter 21 for receiving the multi-way mixed optical signals from the optical splitter 21.

The WGR 22 has a plurality of input ports and a plurality of output ports. Each input port of the WGR 22 receives one mixed optical signal {λ1, λ2, . . . λm}. After the multi-way mixed optical signals from the optical splitter 21 are routed by the WGR 22, each output port of the WGR 22 will output one of wavelength components of each mixed optical signal of the multi-way mixed optical signals, in which one output port can output one wavelength component to an ONU 30. In such a manner, it can provide for n×m (=N) ONUs 30 as shown in FIG. 1.

In above arrangement, the WDM-PON like structure merely uses m wavelengths and n ONUs 30 share the same optical wavelength for the transmission. Herein, the shared ONUs 30 receiving the same wavelength component will adopt a time-division manner (i.e., TDM) for the optical signal coding and transmission. For example, assuming that 8 wavelengths (m=8) are used and the WDM-PON like structure is designed to provide for 32 ONUs 30 (N=32), then every 4 ONUs (n=4) shares the same wavelength by using the TDM. Meanwhile, the ONUs 30 can be equipped with burst mode upstream transmitters (Tx) for the TDM transmission. In an aspect of transmission speed, each ONU has B/n bandwidth in average, where B is the bit rate of each transmitter.

Figure 2:
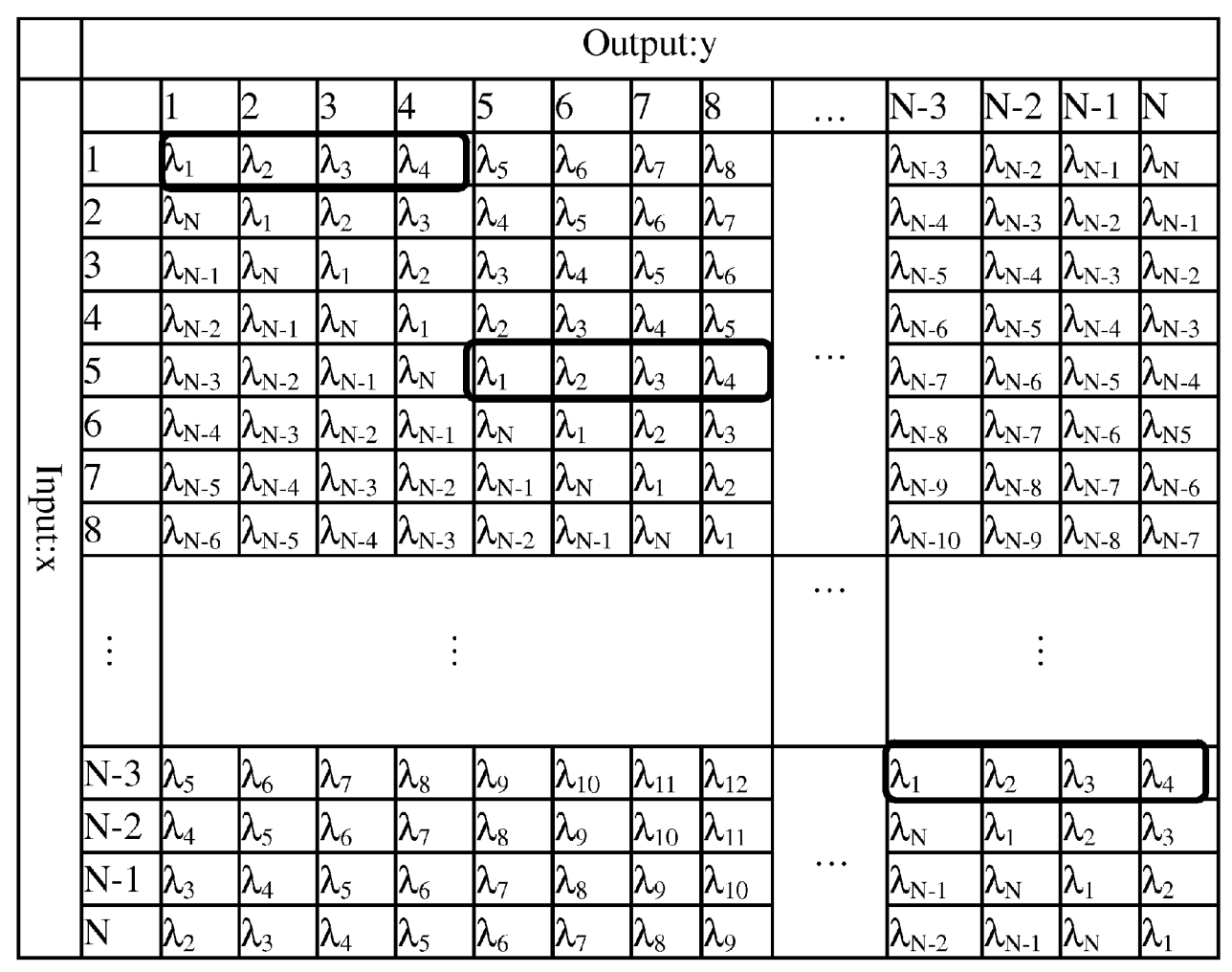

FIG. 2 is a schematic diagram showing input and output of a waveguide grating router. The w-th wavelength to connect between an input port x and an output port y can be expressed as:

$$w = (N - x + y + 1) \bmod N,$$

wherein w represents w-th wavelength and N is a maximum input or output of the array. Therefore, if the mixed optical signal {λ1, λ2, . . . λm } is inputted to port 1, m+1, 2m+1, . . . , the output wavelength at port 1, m+1, 2m+1, . . . , is all λ1. Likewise, the output wavelength at port 2, m+2, 2m+2, . . . , is all λ2, and so on. With such kind of input/output port connection, output ports k, m+k, 2m+k, . . . , will share the same wavelength. These ports need to use burst-mode transmitters at the corresponding ONUs 30 for the TDM transmission. As shown in FIG. 2, the wavelengths sets enclosed by solid lines show an example of how 4 wavelengths are used to connect all the output ports of the WGR.

Compared to a traditional time-division multiplexed passive optical network (TDM-PON), the TWPON of the first embodiment of the present invention can carry out high-capacity transmission at relatively low cost, and does not have a problem of unable to increase transmission capacity in the traditional TDM-PON, caused by the limitation of high-speed transceivers themselves. Compared to a traditional WDM-PON, the TWPON of the first embodiment of the present invention can use less numbers of wavelengths to carry out the same transmission capacity, and meanwhile occupied optical wavelength bands are relatively small and the cost of used light sources is relatively low as well. The TWPON of the first embodiment of the present invention can efficiently integrate and access to the network as desired for quickly increasing numbers of users and bandwidth.

Referring to FIG. 1, the TWPON of the first embodiment of the present invention further comprises a wavelength band filter 23 disposed at the RN 20. The wavelength band filter 23 is coupled to the optical splitter 21 and the WGR 22. The wavelength band filter 23 can make the mixed optical signal {λ1, λ2, . . . λm} from the OLT 10 to pass the optical splitter 21 and make another mixed optical signal {λe1, λe2, . . . λeN} from the OLT 10 to pass one of the input ports of the WGR 22 such that the mixed optical signal {λ1, λ2, . . . λm } is merely allowed to enter the optical splitter 21 and said another mixed optical signal {λe 1, λe2, . . . λeN} is merely allowed to enter one of the input ports of the WGR 22. Moreover, the WGR 22 will respectively output component signals of said another mixed optical signal {λe1, λe2, . . . λeN} to predetermined ONUs 30. As shown in FIG. 1, a WDM band filter 24 may be arranged between each output port of the WGR 22 and corresponding ONU 30. The WDM band filter 24 is utilized to select the wavelength component of the mixed optical signal or the wavelength component of said another optical signal as an output, or select both of them together. If there needs larger bandwidth or provides other services in the future, said another mixed optical signal {λe1, λe2, . . . λeN} can be used to provide for ONUs 30 for greatly increasing transmission capacity, or served as security channels for improving the ability to protect the optical distribution network (ODN).

As shown in FIG. 1, a set of transmitters 11 is arranged at the OLT 10 and optical wavelengths emitted therefrom are multiplexed into the mixed optical signal {λ1, λ2, . . . λm} by a WGR 13 upon downstream transmission. In upstream transmission, the mixed optical signal is demultiplexed by a WGR 14 and then received respectively by receivers 12. Extended light sources also can be disposed at the OLT 10 to generate said another mixed optical signal {λe1, λe2, . . . λeN} for increasing transmission capacity or increasing security. A band filter 15 arranged at the OLT can be utilized to filter wavelengths adaptively.

Also, the OLT 10 further comprises a channel fault monitoring (CFM) module 16 utilized to locate fiber breaks among distribution fibers. In the first embodiment of the present invention, the channel fault monitoring only needs an optical bandwidth covering m wavelengths rather than N wavelengths, and therefore the number of wavelengths used for the channel fault monitoring is reduced efficiently. Compared to the traditional WDM-PON, the present invention uses less numbers of wavelengths for the channel fault monitoring. If the number of ONUs 30 using the same wavelength is small (e.g., n=4), the OTDR should be able to resolve the reflected signals or the distribution fibers can be easily arranged to have different lengths among the shared ONUs. In addition, the upstream transmitters can be implemented by adopting an m-wavelength tunable laser as the light source. Since m is relatively small (m=4 or 8) in the present embodiment, it can adopt a standard distributed Bragg reflector (DBR) laser as the light source. The cost of the DBR is relatively effective as compared to an injected locked FP laser or a colorless transmitter such as a reflective semiconductor optical amplifier (RSOA).

Figure 3:
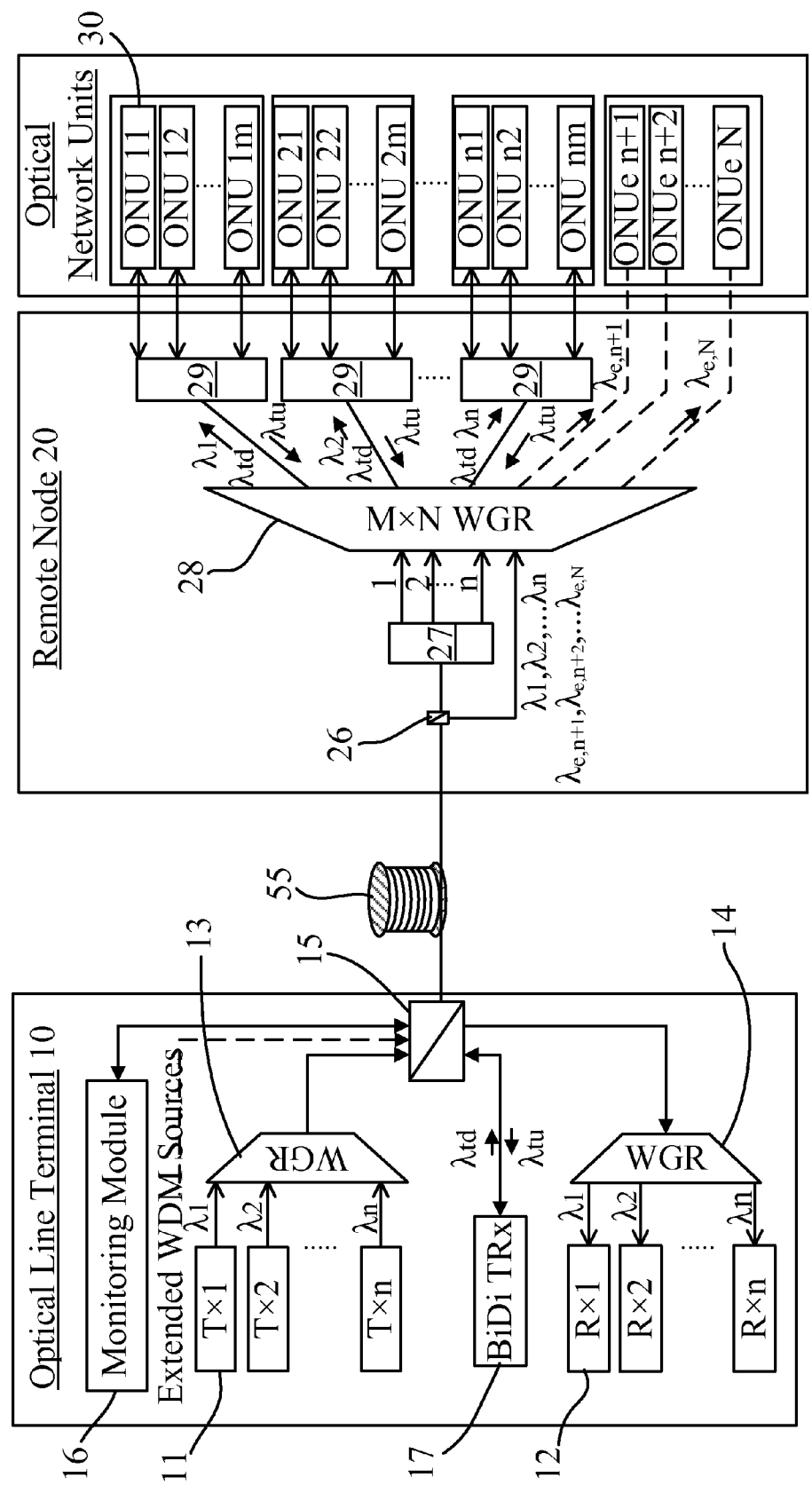
FIG. 3 is a schematic structural diagram showing a TWPON according to a second embodiment of the present invention.

FIG. 3 is a schematic structural diagram showing a time/wavelength-division multiplexed passive optical network (TWPON) according to a second embodiment of the present invention. The TWPON of the second embodiment of the present invention is a TDM-PON like architecture. The present embodiment mainly uses two-stage optical splitters provided for time-division optical signals transmitted in a time-division manner (i.e., TDM). An M×N multiple-input and multiple-output waveguide grating router is inserted between the two-stage optical splitters. The TWPON of the second embodiment of the present invention can provide three classes of services, which respectively are (1) pure TDM-PON services, (2) Hybrid PON services, and (3) pure WDM-PON services. Therefore, the TWPON of the second embodiment can provide different services in response to different demands for transmission bandwidth and also can increase transmission capacity at relatively low cost in response to the increasing of users.

(1) Pure TDM-PON services: a 1×n first-stage optical splitter 27, an M×N WGR 28, and a plurality of 1×m second-stage optical splitters 29 are disposed at the RN 20. The first-stage optical splitter 27 receives a time-division optical signal λt from the OLT 10, and splits or shunts the time-division optical signal λt to form multi-way (e.g., n ways) time-division optical signals. The WGR 28 is coupled to the outputs of the first-stage optical splitter 27. The WGR 28 has n input ports that respectively receive the aforesaid multi-way time-division optical signals. The multi-way time-division optical signals are outputted respectively by output ports of the WGR 28, wherein each output port outputs a single-way time-division optical signal. The second-stage optical splitters 29 are respectively coupled to the output ports of the WGR 28. Each second-stage optical splitter 28 will split the time-division optical signal outputted from corresponding output port of the WGR 28 again, for example, splitting into m ways. The time-division optical signals from the second-stage optical splitters are respectively transmitted to the respective ONUs 30. In such a manner, it can serve n×m (=N) ONUs 30 as shown in FIG. 3.

Figure 4:
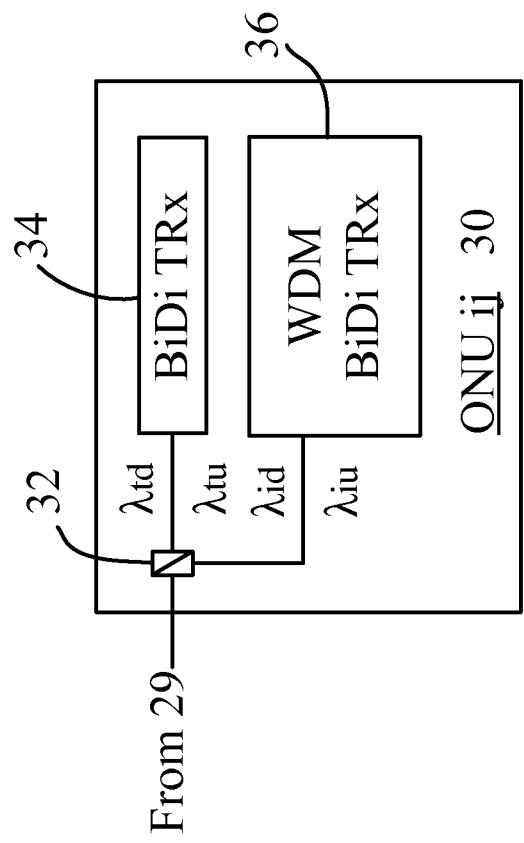
FIG. 4 is a schematic diagram showing an optical network unit in the second embodiment of the present invention.

The time-division optical signals at the wavelength of λt can be transmitted and received by using bidirectional (BiDi) transceivers 17, 34 that are disposed at the OLT 10 and the respective ONUs 30 (see FIG. 3 and FIG. 4). For example, burst mode transmitters at the ONUs 30 and burst mode receivers at the OLT 10 are needed for transmitting an upstream time-division optical signal λtu in the upstream transmission. Burst mode transmitters at the OLT 10 and burst mode receivers at the ONUs 30 are needed for transmitting a downstream time-division optical signal λtd in the downstream transmission. In an aspect of transmission speed, each ONU 30 has a bandwidth of B1/N, where B1 is the bandwidth of the TDM-PON service.

(2) Hybrid PON services: a wavelength band filter 26 is disposed at the RN 20. The wavelength band filter 26 is arranged at a front end of the first-stage optical splitter 27. The wavelength band filter 26 is utilized to select a mixed optical signal {λ1, λ2, . . . λn}, which comprises a set of wavelengths (e.g., n wavelengths) that are different from each other, from the OLT 10, and make the mixed optical signal {λ, λ2, . . . λn} entering one of the input ports (e.g., (n+1)th input port) of the WGR 28. After the mixed optical signal {λ1, λ2, . . . λn} is routed by the WGR 28, the output ports of the WGR 28 will respectively output the respective component signals λ1, λ2, . . . λn of the mixed optical signal to the respective second-stage optical splitters 29. For example, an optical signal of i-th wavelength λi is transmitted to i-th second-stage optical splitter 29. The component signal received by each second-stage optical splitter 29 is split to form m ways again, for example. Therefore, m ONUs 30 share the same wavelength such that it can serve n×m (=N) ONUs 30 as shown in FIG. 3.

In above arrangement, the WDM-PON merely uses n wavelengths and every m ONUs shares the same wavelength for the transmission. The shared ONUs 30 receiving the same wavelength component will adopt a time-division manner (i.e., TDM) for the optical signal coding and transmission. For example, assuming that 4 wavelengths (n=4) are used and the structure is designed to provide for 32 ONUs 30 (N=32), then every 8 ONUs (m=4) shares the same wavelength by using the TDM. Meanwhile, the ONUs 30 can be equipped with burst mode upstream transmitters (Tx) for the TDM transmission. In an aspect of transmission speed, each ONU 30 has B2/m bandwidth in average, where B2 is the bit rate of each transmitter of the Hybrid PON.

(3) Pure WDM-PON services: the wavelength band filter 26 disposed at the RN 20 further can be used to select another mixed optical signal {λe, n+1, λe, n+2, . . . λe, N} from the OLT 10 and make said another mixed optical signal {λe, n+1, λe, n+2, . . . λe, N} entering one of the input ports of the WGR 28. Said another mixed optical signal comprises another set of wavelengths that are different from each other. The output ports of the WGR 28 will respectively output component signals λe, n+1, λe, n+2, . . . λe, N of said another mixed optical signal to predetermined ONUs 30, for example, (n+i) th ONU. In such a manner, it can efficiently increase the number of users. Meanwhile, each ONU 30 can be equipped with a WDM bidirectional transceiver 36 for the WDM transmission (see FIG. 4). The wavelength components λe, n+1, λe, n+2, . . . λe, N of said another mixed optical signal can be an integer multiplicity of λFSR (free spectral range) away from the wavelength components λ1, λ2, . . . λn of the mixed optical signal. If there needs larger bandwidth or provides other services in the future, said another mixed optical signal {λe, n+1, λe, n+2, . . . λe, N} can be used to provide for each ONU 30 for greatly increasing transmission capacity. In an aspect of transmission speed, the bandwidth of each ONU 30 is B3, where B3 is the bit rate of each transmitter of the WDM-PON.

In addition, each ONU 30 may need a WDM band filter 32 to separate the three classes of service channels. The WDM band filter 32 can also be placed at the output port of the second-stage optical splitter 29 to provide signals for the ONUs 30.

A channel fault monitoring (CFM) module 16 located at the OLT 10 can be utilized to locate fiber breaks among distribution fibers. In the second embodiment of the present invention, the channel fault monitoring can follow any of the signal paths of the three classes of services by using a wavelength band that is an integer multiplicity of λFSR away from the signal band and a suitable band filter. However, it also can merely use the Hybrid PON path because of its compromised optical bandwidth and splitting loss for the monitoring signal. This can be implemented by using a tunable laser or a broadband light source that covers an optical bandwidth of n wavelengths rather than N wavelengths. In such a manner, the number of used wavelengths for the channel fault monitoring is reduced efficiently. If the number of the shared ONUs 30 is relatively small (e.g, m=4), the OTDR should be able to resolve the reflected signals or the distribution fibers can easily arranged to have different lengths among the shared ONUs 30 for performing the channel fault monitoring.

Figure 5:
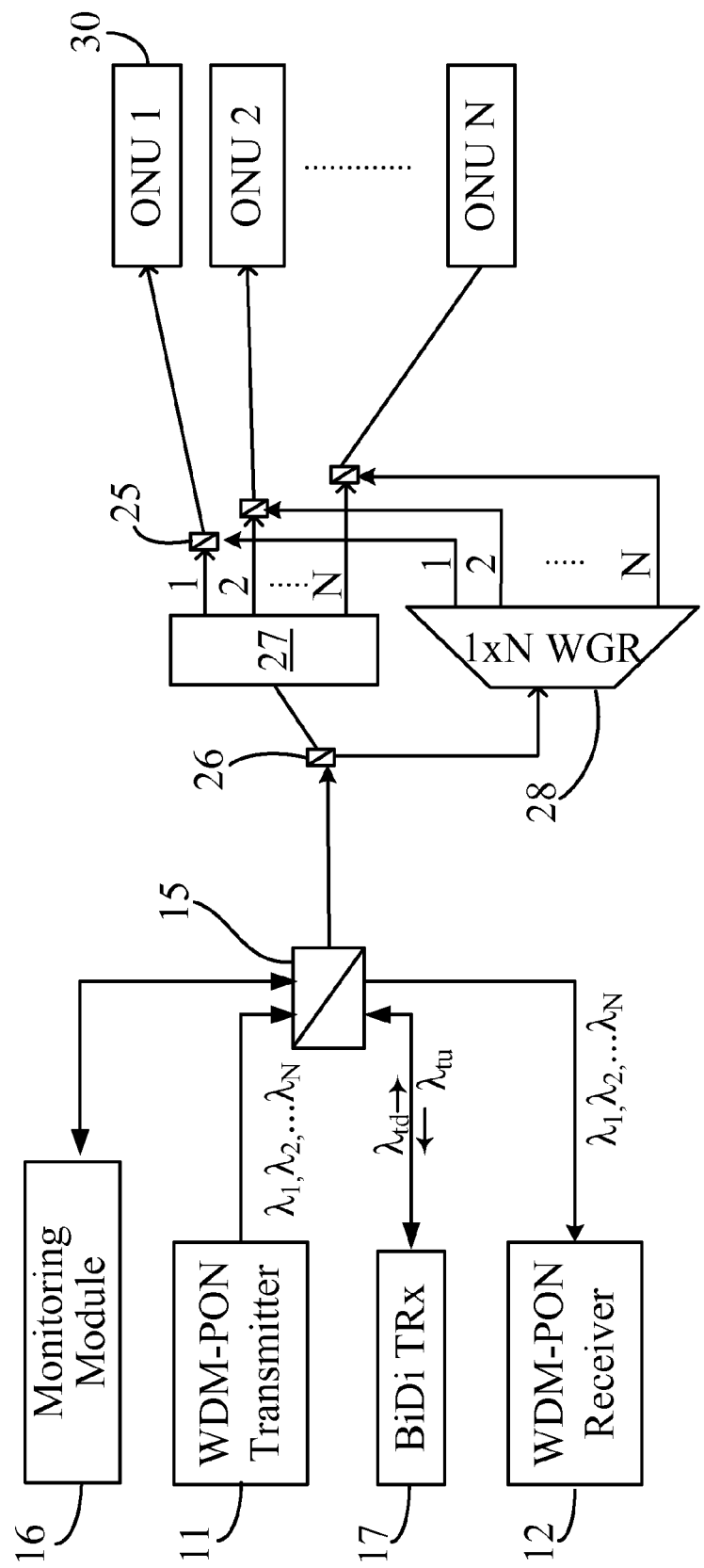
FIG. 5 is a schematic structural diagram showing a TWPON according to a third embodiment of the present invention.

FIG. 5 is a schematic structural diagram showing a time/wavelength-division multiplexed passive optical network (TWPON) according to a third embodiment of the present invention. As shown in FIG. 5, a 1×N optical splitter 27, a 1×N waveguide grating router 28, and a plurality of WDM wavelength band filters 25 are arranged at the RN 20. The optical splitter 27 receives a time-division optical signal λt from the OLT 10 and splits the time-division optical signal λt to form multi-way (e.g., N ways) time-division optical signals. The WGR 28 is arranged in parallel with the optical splitter 27. The input port of the WGR 28 receives a mixed optical signal {λ1, λ2, . . . λN} from the OLT 10 and the mixed optical signal {λ1, λ2, . . . λN} comprises a set of wavelengths (e.g., N wavelengths) that are different from each other. The N output ports of the WGR 28 respectively output wavelength components λ1, λ2, . . . λN of the mixed optical signal. The WDM wavelength band filters 25 are respectively disposed between corresponding output ports of the optical splitter 27 and the WGR 28. Each one of the WDM wavelength band filters 25 is connected to one ONU 30 for selecting the time-division optical signal λt to be transmitted with a time-division manner or selecting one of the wavelength components λ1, λ2, . . . λN of the mixed optical signal to be transmitted with a wavelength-division manner. Compared to the second embodiment, the third embodiment of the present invention can reduce the number of the WDM wavelength band filter 25. It is also easier for photonic integration of all passive components at the RN 20 due to less number of crossovers in the third embodiment.

Figure 6:
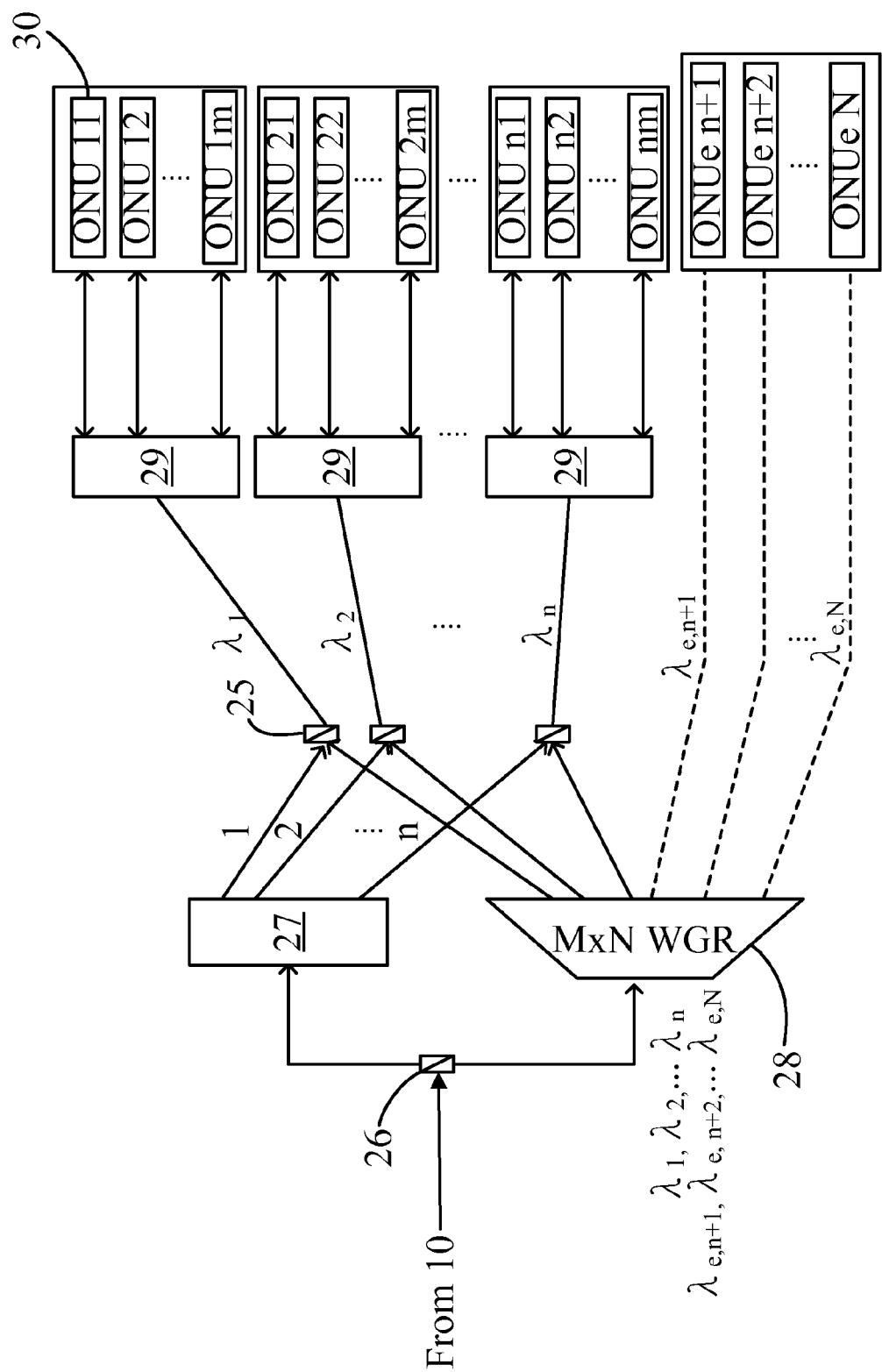
FIG. 6 is a schematic structural diagram showing a TWPON according to a fourth embodiment of the present invention.

FIG. 6 is a schematic structural diagram showing a time/wavelength-division multiplexed passive optical network (TWPON) according to a fourth embodiment of the present invention. Compared to the third embodiment, the fourth embodiment of the present invention further comprises a plurality of second-stage optical splitters 29. Each second-stage optical splitter 29 is arranged between one WDM wavelength band filter 25 and one ONU 30. The second-stage optical splitters 29 are connected to the WDM wavelength band filters 25 in a one-to-one relationship. Each of the second-stage optical splitters 29 is utilized for splitting a time-division optical signal λt or one of wavelength components λ1, λ2, . . . λN of a mixed optical signal from corresponding WDM wavelength band filter 25 again, and then transmitting them to the respective ONUs 30. In the fourth embodiment of the present invention, it also can provide another mixed optical signal {λe, n+1, λe, n+2, . . . λe, N} for each ONU 30 for further increasing the number of users.

The advantage of the fourth embodiment of the present invention is that the TDM-PON transmission does not have extra insertion loss from the WGR 28.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A time/wavelength-division multiplexed passive optical network (TWPON), which is divided into an optical line terminal, a remote node, and a plurality of optical network units in structure, characterized in that the TWPON comprises:

a first-stage optical splitter for splitting a received time-division optical signal to form multi-way time-division optical signals;

a multiple-input and multiple-output waveguide grating router, coupled to outputs of the optical splitter, having a plurality of input ports and a plurality of output ports, wherein the input ports respectively receives the multi-way time-division optical signals, the output ports respectively outputs the multi-way time-division optical signals, and each output port outputs a single time-division optical signal;

a plurality of second-stage optical splitters respectively coupled to the output ports of the multiple-input and multiple-output waveguide grating router, wherein each second-stage optical splitter is utilized to split the single time-division optical signal outputted from each output port of the multiple-input and multiple-output waveguide grating router again, and the time-division optical signals split and obtained from the second-stage optical splitters are respectively transmitted to the optical network units; and a wavelength band filter disposed at a front end of the first-stage optical splitter, wherein the wavelength band filter is utilized to select a mixed optical signal, which comprises a set of wavelengths that are different from each other, from the optical line terminal, and make the mixed optical signal entering one of the input ports of the multiple-input and multiple-output waveguide grating router, the output ports of the multiple-input and multiple-output waveguide grating router respectively output wavelength components of the mixed optical signal to the respective second-stage optical splitters, and each second-stage optical splitter splits the received wavelength component, wherein at least two optical signals having the same wavelength component received by optical network units are coded and transmitted with a time-division manner.

2. The TWPON according to claim 1, wherein the wavelength band filter is utilized to select another mixed optical signal, which comprises another set of wavelengths that are different from each other, from the optical line terminal and make the another mixed optical signal entering one of the input ports of the multiple-input and multiple-output waveguide grating router, and the output ports of the multiple-input and multiple-output waveguide grating router respectively output component signals of the another mixed optical signal to predetermined optical network units.

3. The TWPON according to claim 1, further comprising a bidirectional transceiver disposed at the optical line terminal for transmitting and receiving the time-division optical signals.

4. The TWPON according to claim 1, wherein the first-stage optical splitter, the multiple-input and multiple-output waveguide grating router, the second-stage optical splitters, and the wavelength band filter are located at the remote node.

* * * * *